(No Model.)
J. J. BOGARD.
Animal Shears.
No. 240,953.
Patented May 3, 1881.
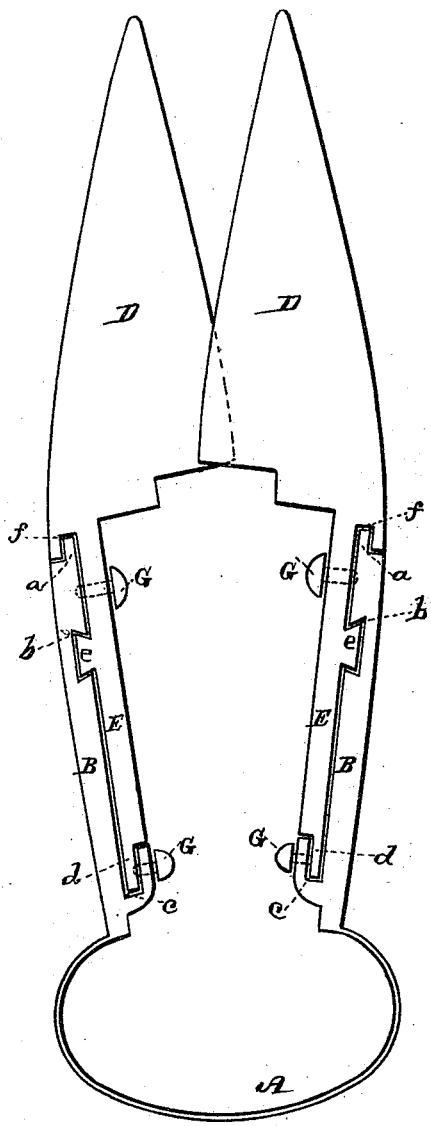

UNITED STATES PATENT OFFICE.

JOHN J. BOGARD, OF TEHAMA, CALIFORNIA.

ANIMAL-SHEARS.

SPECIFICATION forming part of Letters Patent No. 240,953, dated May 3, 1881.

Application filed February 25, 1881. (No model.)

*To all whom it may concern:*

Be it known that I, JOHN J. BOGARD, of the city and county of Tehama, State of California, have invented an Improvement in Sheep-Shears; and I hereby declare the following to be a full, clear, and exact description thereof.

My invention relates to certain improvements in that class of sheep-shears which are constructed of several parts, the object of which is to render the blades detachable; and it consists in providing each of the blades with an extended shank by which they are attached by a peculiar joint to the arms or handles of the spring-bow.

The object of the invention is to make a joint securing the blades to the handles, which, while permitting them to be easily detached therefrom when necessary, will be firm in itself and so constructed that natural wear will not loosen or render it imperfect, but will, on the contrary, make it as tight and firm when in use as at first.

Referring to the accompanying drawing, the figure is a view of my invention.

Let A represent the spring-bow provided with the arms or handles B, said handles having a curved outer surface for convenience in grasping and a flat inner surface. The ends of the handles B have a tongue, *a*, on their outer sides, as shown. On their flat sides they are provided with a mortise, *b*, with receding sides, and their inner lines near the spring-bow have a groove or slot, C, with a projecting lip, as shown.

Let D represent the blades provided with extended shanks E. The end of the shank is cut away to form a tongue, *d*, as shown, to fit the groove *c* upon the handle. Its outer surface is provided with a dovetail tenon, *e*, for fitting in the mortise *b*, and the end of the shank nearest the blade has the groove or slot *f*, with a projecting lip, into which the tongue *a* upon the handle fits. The shanks of the blades are fitted into the handles from the side, the dovetail tenon fitting into the mortise, and the tongues and grooves on both corresponding with each other, as shown. Screws G hold the two together and prevent any side play. By loosening the screws the blades can be slipped to one side and detached from the handles. This joint gives strength to the shears, because of the length of the handles B and shanks E, thus forming a solid connection.

It will be seen that when resistance is offered to the closing of the blades the pressure is directed upon the shoulder of the tongue *a*, and the drawing force is resisted by the dovetail joint, while the inward pressure is resisted by the lip on the groove *c*. Each connection serves to hold the blades tightly to the handles. If, in time, these joints should become worn and the blades do not fit as tightly as at first, the pressure, when resistance is offered, is still in the same direction, and the blades are forced as tightly against the joints as ever. The wear will not be in a side direction, which would cause the blades to pass each other without cutting, but it is in a direction in line with the cutting, so that a slight play of that kind will not render the shears less effective. The screws prevent any side play. The long handles B of the spring-bow and the long shanks E of the blades enable me to form this joint and assist in making a solid connection for the blades.

The exterior surfaces of the handles are corrugated or roughened, so as to give a good gripe.

I do not claim, broadly, shears formed with detachable blades; but

What I do claim as new, and desire to secure by Letters Patent, is—

In a pair of shears, the combination of the spring-bow A, having arms or handles B, said handles being provided with the tongues *a*, mortises *b*, and grooves *c*, and the blades D, having shanks E, provided with the grooves *f*, dovetail tenons *e*, and tongues *d*, the shanks E of the blades fitting the handles and secured by screws or equivalent devices, to prevent side play, substantially as described.

In witness whereof I have hereunto set my hand.

JOHN J. BOGARD.

Witnesses:
S. H. NOURSE,
FRANK A. BROOKS.